United States Patent Office 2,849,456
Patented Aug. 26, 1958

2,849,456

PREPARATION OF DEHYDROACETIC ACID

Sidney John Branch, Cottingham, East Yorks, England, assignor to The Distillers Company Limited, Edinburgh, Scotland, a British company No Drawing. Application September 3, 1957
Serial No. 681,469

Claims priority, application Great Britain
September 14, 1956

7 Claims. (Cl. 260—343.5)

This invention relates to the production of dehydroacetic acid from diketene.

Dehydroacetic acid is an anti-mycotic agent having a low toxicity and is widely used for this purpose in food wrappings, paints and in toothpastes, deodorant creams, lotions and other cosmetic preparations. The method of preparing dehydroacetic acid by bringing about the dimerization of diketene at an elevated temperature is well known and may, for instance, be carried out by adding the diketene to an inert solvent in the presence of a catalyst.

It is an object of the present invention to provide a process for the production of dehydroacetic acid whereby improved yields of the desired product are obtained.

According to the present invention, the process for the production of dehydroacetic acid comprises adding diketene to an inert solvent in the presence of trimethylamine, the addition being made under substantially anhydrous conditions and at a temperature in the range of —10° to 50° C., and recovering the dehydroacetic acid so produced.

Diketene is added to the inert solvent preferably at a rate no greater than that at which it is converted to dehydroacetic acid. In order to obtain good yields of the desired product, it is generally necessary to avoid adding the diketene at a rate greatly in excess of that at which it is consumed, since a high concentration of diketene tends to favour the occurrence of side-reactions which give rise to products other than dehydroacetic acid. The diketene is preferably added continuously.

The inert solvent used is a solvent which does not react chemically to any significant degree with the diketene under the conditions of the process of the invention; the preferred solvent is an aromatic hydrocarbon such as benzene, toluene or xylene.

It is an essential feature of the invention that the process is carried out under substantially anhydrous conditions, that is, the reaction mixture should not contain more than 0.1% by weight of water. The presence of water is detrimental if good yields of the desired product are to be obtained.

The catalyst used in the process is trimethylamine. The catalyst may conveniently be dissolved in a non-aqueous solvent such as methanol and this solution mixed with the inert solvent used in the process before addition of diketene is made; preferably however the non-aqueous solvent is the inert solvent.

The concentration of the trimethylamine in the reaction solution before addition of the diketene may be chosen from a wide range. The choice of a convenient concentration will depend, among other factors, on the nature of the solvent employed and also on the rate at which it is desired to add the diketene. Using the trimethylamine dissolved as a 25% solution in methanol (25 parts by weight of trimethylamine in 100 parts by volume of methanol), for example, if the ketene is to be added at the rate of 100 parts by volume per hour to 400 parts by volume of the inert solvent and if 5 parts by volume of the trimethylamine solution are used, the concentration of trimethylamine in the reaction solution is preferably about 0.30% by volume; if the diketene is to be added at the rate of 50 parts by volume per hour trimethylamine may suitably be employed at a concentration of about 0.15% by volume.

Addition of the diketene to the solvent is made at a temperature in the range from —10° to 50° C., and preferably in the range 10° to 20° C. Since the dimerization reaction is exothermic, it is necessary to provide suitable means to maintain the temperature within this range. The rate of addition of the diketene and the proportions of the diketene, solvent and catalyst present may be arranged so that adequate dissipation of the heat of dimerization liberated is achieved, thus enabling the temperature to be more readily controlled.

The dehydroacetic acid produced by the process of the invention may be recovered, and if necessary purified, by any suitable known method. The solid material may, for example, be removed from the dimerization product by filtration or centrifuging; the crude dehydroacetic acid so obtained may be washed with a suitable solvent, dried and then purified by sublimation. Alternatively, the dehydroacetic acid may be purified by co-distilling with methyl acetoacetate after removal of the solvent by distillation under reduced pressure. The inert solvent used in the process may also be recovered if desired The process of the invention may be carried out batchwise or continuously. In order to carry out the process continuously, some or all of the dehydroacetic acid may be separated from the product and the residue containing the inert solvent used in a further dimerization reaction with more diketene. It is preferred when operating the process continuously, to remove any acetic acid present before recycling the inert solvent residue; the presence of acetic acid has been found to have a slightly detrimental effect on the yield of dehydroacetic acid.

The following examples illustrate the process of the present invention. Parts by weight shown therein bear the same relation to parts by volume as do kilograms to litres.

*Example 1*

5 parts by volume of a 25% solution of trimethylamine in methanol (25 parts by weight of trimethylamine in 100 parts by volume of methanol) were mixed with 400 parts by volume of toluene. This solution was cooled and 250 parts by volume of diketene were then added, the addition of diketene being made continuously at a rate of about 100 parts by volume of diketene per hour and the temperature being maintained at 15° C.

When all the diketene had been added, 211.7 parts by weight of the solid crude dehydroacetic acid, containing 195.9 parts by weight of dehydroacetic acid were separated from the product by filtration. The filtrate, containing 50.5 parts by weight of dehydroacetic acid, consisted otherwise largely of toluene and was retained for use in dimerizing a further quantity of diketene by the same method.

The crude dehydroacetic acid was washed with a little toluene, dried and then purified by co-distillation with methyl acetoacetate. The dehydroacetic acid was obtained as a white crystalline product; the total yield, including the acid in the filtrate, was 92.5% by weight based on diketene.

*Example 2*

The process of Example 1 was carried out at a dimerization temperature of 40° C., the reaction conditions and recovery procedure being otherwise the same. The yield of dehydroacetic acid obtained was 86% by weight based on diketene.

Example 3

The process of Example 1 was carried out at a dimerization temperature of 50° C., the reaction conditions and recovery procedure being otherwise the same. The yield of dehydroacetic acid obtained was 85% by weight based on diketene.

As a comparison with the present invention, the processes of Examples 1, 2 and 3 were carried out at various dimerization temperatures above 50° C. At 60° C., the yield of dehydroacetic acid obtained was 82% by weight, while the corresponding yields using temperatures of 80° C., and 110° C., were 76% and 67% respectively. In each case the yields given are by weight and are based on diketene.

Example 4

5 parts by volume of a 25% solution of trimethylamine in methanol (25 parts by weight of trimethylamine in 100 parts by volume of methanol) were placed with 395 parts by volume of benzene in a reactor fitted with a stirrer, an immersion thermometer, an efficient water-cooled condenser and a diketene feed point.

The contents of the reactor were stirred while 250 parts by volume of 98 to 99% pure diketene were added at the rate of 100 parts by volume per hour; the temperature was maintained within the range from 15° to 20° C., during the addition of the diketene.

When the addition of diketene was complete, the dehydroacetic acid produced was recovered and purified as described in Example 1, being obtained in a yield of 90%.

Example 5

The process of Example 4 was carried out with toluene as the inert solvent instead of benzene, the procedure being otherwise the same.

Dehydroacetic acid was obtained in a yield of 91%.

As a comparison with the process of the present invention in which trimethylamine is used as catalyst, the procedure of Example 5 was repeated with the same concentration (0.30% by volume) of triethylamine in the reaction solution. The reaction and recovery were otherwise carried out as given in Example 5, except that after addition of the diketene had been completed the mixture was maintained in the temperature range from 15° to 20° C., with stirring for a total of 50 hours.

The yield of dehydroacetic acid obtained was only 52%, even after allowing the extra time for reaction.

Example 6

The process of Example 5 was repeated, the temperature of the reactor and contents being maintained within the range from 25° to 30° C., while carrying out the addition of the diketene; the procedure was otherwise the same.

Dehydroacetic acid was obtained in a yield of 87%.

Example 7

The process of Example 6 was carried out with xylene as the inert solvent instead of toluene, the procedure being otherwise the same.

Dehydroacetic acid was obtained in a yield of 87%.

Example 8

The process of Example 5 was carried out under the same conditions except that the addition of diketene was effected at a temperature of −5° C.

The yield of dehydroacetic acid obtained was 87.5%.

Example 9

The process of Example 8 was repeated except that the diketene was added at the rate of 50 parts by volume per hour instead of 100 parts by volume per hour; the temperature was again maintained at −5° C.

The yield of dehydroacetic acid obtained was 91.8%.

Example 10

25 parts by volume of a 5% solution of trimethylamine in toluene (5 parts by weight of trimethylamine in 100 parts by volume of toluene) were placed in a reactor with 395 parts by volume of toluene; the mixture was stirred and maintained at a temperature of −10° C., while 250 parts by volume of 98 to 99% pure diketene were added at the rate of 100 parts by volume per hour.

The dehydroacetic acid was recovered and purified as described in Example 1 and was obtained in a yield of 96.3%.

Example 11

The process of Example 9 was carried out except that during the addition of diketene the temperature was maintained at a temperature of −10° C. The procedure was otherwise the same.

Dehydroacetic acid was obtained in yield of 92.1%.

Example 12

The process described in Example 5 was carried out and dehydroacetic acid was obtained in a yield of 90%. After recovering the dehydroacetic acid from it, the residual liquid, consisting largely of toluene and containing relatively small quantities of acetic acid and unrecovered dehydroacetic acid, was recycled to the reactor. A further 250 parts by volume of the diketene were then added at the rate of 100 parts by volume per hour, maintaining the temperature within the range from 15° to 20° C. during the addition.

Dehydroacetic acid was recovered and purified as before, a yield of 85% being obtained. The residual liquid was again recycled and two further runs of the process were carried out. The yield of dehyroacetic acid from the third run was 82%, while that from the fourth run was 78%.

Example 13

The process of Example 12 was repeated except that the acetic acid present in the residual liquid after removal of the dehydroacetic acid was removed at the end of each run by distilling it off as a toluene/acetic acid azeotrope.

A total of five runs of the process were made, the yield of dehydroacetic acid being 95% from the first run and 92%, 90%, 89% and 85% in the first, second, third and fourth recyclings respectively.

I claim:

1. A process for the production of dehydroacetic acid which comprises adding diketene to an inert solvent in the presence of trimethylamine, the addition being made under substantially anhydrous conditions and at a temperature in the range from −10° to 50° C. and recovering the dehydroacetic acid so produced.

2. The process claimed in claim 1 wherein the diketene is added to a mixture of the inert solvent and a solution of the trimethylamine in a non-aqueous solvent.

3. The process claimed in claim 2 wherein the non-aqueous solvent is the inert solvent.

4. The process claimed in claim 1 wherein the inert solvent is selected from the group consisting of benzene, toluene and xylene.

5. The process claimed in claim 1 wherein the addition of the diketene is made at a temperature in the range from 10° to 20° C.

6. The process claimed in claim 1 wherein dehydroacetic acid is separated from the product of the addition, a further quantity of diketene is added at a temperature in the range from −10° to 50° C. to the residual liquid after separating the dehydroacetic acid and the dehydroacetic acid so produced is recovered.

7. The process claimed in claim 6 wherein acetic acid is removed from the residual liquid before the further quantity of diketene is added.

No references cited.